Patented Aug. 4, 1942

2,291,697

UNITED STATES PATENT OFFICE 2,291,697

METHOD FOR MAKING PLASTIC COMPOSITIONS

Henry L. Cox, South Charleston, and Jacob D. Matlack, Charleston, W. Va., assignors to Carbide and Carbon Chemicals Corporation, a corporation of New York No Drawing. Application December 15, 1938, Serial No. 245,910

2 Claims. (Cl. 260—36)

The desirability of improving such qualities as plasticity, flexibility, and adhesiveness in many artificial thermoplastic resins has long been recognized where these resins are intended for use in such applications as lacquers, as well as coating and adhesive compositions. This requirement is usually satisfied by incorporating appropriate amounts of compatible high-boiling solvents or plasticizers with the resins. However, superficial combinations of the resin and plasticizer, such as may be obtained by casual mixing of the plasticizer with the powdered resin, are usually not sufficient to fulfill this requirement since the product obtained thereby is almost invariably nothing more than a dampened and somewhat cohesive powder. It is almost always essential to combine the resin and the plasticizer under such conditions that the nature of the combination approaches a solid colloidal solution of the plasticizer and the resin. However, it is commonly observed that the high-boiling compounds which have the necessary plasticizing qualities do not possess, as a rule, sufficient solvation power to form such colloidal solutions on mere bringing the resin in its usual form in contact with the appropriate amount of plasticizer required to soften but not completely dissolve the resin. The attention of the art has therefore been directed towards means of facilitating such colloidal solutions of the plasticizer and the resin.

Such means have almost universally been directed to softening the resins during plasticization to insure penetration of the resins by the plasticizer, and they have included practically all the known technology in the softening of thermoplastic artificial resins. These methods need be but briefly considered here. It is known that these resins may be softened by heating or by appropriate mechanical manipulation, such as by working the resins on a roll mill, or by a proper combination of both heating and mechanical manipulation. A very commonly employed method of combining plasticizers with these resins takes advantage of this latter property and subjects the viscous mixture of resin and plasticizer to heating, combined with a mechanical manipulation which may involve the use of machines of the dough-mixing type. Under such conditions the plasticizer tends to combine quite intimately with the resin. However, if fused or horny particles of resin are present as a consequence of drying or other treatment to which the resin may have been previously subjected, such particles do not become homogenously dispersed but tend to form distinct and gel-like particles of incompletely plasticized material. Such particles are undesirable because they impair the clarity of sheets pressed from the colloided product. Where the product is intended to serve as a reinforcing layer in safety glass, such particles cannot be tolerated.

In working with certain resins, such as the polyvinyl partial acetal resins, the above procedure has been modified to some extent by the use of certain agents which wet and swell the resins in the plasticizing operation. These agents, moreover, are included in amounts insufficient to affect materially the consistency of the mass being mixed.

Another general method of softening the thermoplastic artificial resins is to bring them in contact with a solvent for the resins or mixtures of solvent and non-solvent. It has also been proposed to plasticize these resins while maintaining them in such contact.

This invention departs from this previous principle of maintaining the resins in a softened condition by the application of heat or by the use of solvents or softening agents during the plasticizing operation, involving, as it does, the use of special means and agents. According to the essential embodiment of this invention, the resins are subjected to a simple but highly effective treatment prior to combining the resins with the plasticizer. This treatment converts the resins to a form having a physical structure in which they readily combine with plasticizers, without the use of special softening agents or methods, to form compositions approaching colloidal solid solutions of the plasticizer in the resins.

This treatment may be carried out by first forming a fluid solution of the resins in an organic solvent. Any dirt or undissolved resin may be removed from the solution by filtration. A liquid which is a non-solvent for the resin, but which is miscible with the solvent employed, is slowly added with agitation to the solution. The resins are thereby thrown out of solution in the form of a fine granular powder. This powder has an amorphous and very porous structure. We believe that it is this porous structure of the precipitated resin particles, as opposed to the closed and somewhat hardened surface normally existing on dried particles of these resins, which induces the ready penetration of the precipitated resins by plasticizers.

The precipitated resinous powder is thoroughly washed with a non-solvent to remove every trace of solvent in so far as is practical. The powder is then suspended in a liquid which is a non-solvent for the resin and agitated with a compatible plasticizer. It is essential that the non-solvent selected as the suspending medium be also immiscible with the plasticizer. The resin rapidly absorbs the plasticizer because of its extreme porosity, and the two combine to form a homogeneous colloidal composition product. This product may be rolled into a sheet or extruded in a variety of shapes. These fabricated forms of the composition are of excellent clarity and entirely free from uncolloided and incompletely plasticized material.

The precipitation treatment is essential for the success of our invention since satisfactory dispersions of resin and plasticizer cannot be obtained by agitating a suspension of a dry and powdered resin with a plasticizer.

This new process of plasticizing these resins may be advantageously carried out as an integrated step in the manufacture of the resins. The crude resins resulting from the manufacturing operations are frequently purified by precipitating the resins from solution. It is at this point that the resins may be washed free from solvents and undesirable impurities and subjected to the plasticizing operations as hereinbefore described. It will be obvious that such integration will result in marked economy both in the solvents employed as well as in the labor and equipment required.

For reasons of economy it is preferred to use water as the non-solvent in each of the above operations, yet it is to be understood that any non-solvent fulfilling the limitations defined above may be used. When water is employed as the precipitating agent in the precipitating treatment, it is, of course, necessary to use a water-miscible solvent to dissolve the resins.

The term "artificial resins" as used in the preceding description and in the appended claims is intended to include soluble thermoplastic resins, including polyvinyl acetal resins, polyvinyl partial acetal resins, vinyl resins, such as products of the conjoint polymerization of vinyl halides with vinyl esters of aliphatic acids, polystyrene resins, polyacrylate and polymethacrylate resins, polymerized hydrocarbon resins, and the like.

A few examples of our invention will now be given as applied to certain specific artificial resins. The particular solvents, non-solvents, and plasticizers described are those appropriate to the materials mentioned and, when working with other materials, the proper solvents, non-solvents and plasticizers for each material should be selected as is known in the art.

*Example 1*

A solution of 28.3 parts by weight of a polyvinyl partial butyral resin, approximately 66% acetalized with butyraldehyde, in approximately 350 parts by weight of methanol, was formed and it was filtered to remove any solid particles. Water was slowly added with agitation to the clarified solution and the resin was precipitated in the form of a finely-divided powder of porus structure. This powder was washed substantially free of solvent by agitating it several times with water. The resin particles were then suspended in about 500 parts of water by means of an agitator and 12.7 parts by weight of a compatible plasticizer, triethylene glycol di(2-ethyl butyrate), were added. The mixture was stirred for a shorttime until the plasticizer had penetrated all the resin particles causing them to coalesce. The mixture was allowed to stand for a period of 16 hours to insure complete absorption of the plasticizer by the resin. The combination of the plasticizer with the resin was unusually intimate and in no sense superficial. The plasticized resin was admirably adapted to serve as a reinforcing layer for safety glass.

The effluent water was drained from the plasticized resin and the remaining water was removed by drying the resin at 70° C. The plasticized material was sheeted on a roll mill and samples of these sheets were molded between sheets of glass. The samples were exceptionally free of unplasticized particles indicating complete penetration of all the resin particles by the plasticizer.

*Example 2*

A solution of 550 parts by weight of a resin, resulting from the conjoint polymerization of vinyl chloride with vinyl acetate, in about 2500 parts of acetone was formed and was clarified by filtration. The resin was precipitated as a fine powder by the addition of water. The precipitate was washed several times with water to remove the solvent. It was then suspended in about 5000 parts of water by means of an agitator and 60 parts of a compatible plasticizer, dibutyl phthalate, were added. Upon stirring the suspension, the resin quickly absorbed and united with the plasticizer. The excess water was removed from the plasticized resin by draining and drying. A sheet milled from the plasticized resin possessed excellent clarity. Samples molded from this sheet were free from unplasticized particles.

*Example 3*

In a manner as described in the previous examples, 300 parts of a polyvinyl partial acetal resin, approximately 80% acetalized with acetaldehyde, were plasticized with 76 grams of diethyl phthalate. The plasticized resin was unusually free from unplasticized, gel-like particles.

*Example 4*

In a manner as described in the previous examples, 300 parts of a polyvinyl partial acetal resin, approximately 95% acetalized with formaldehyde, were plasticized with 76 grams of diethyl phthalate. The plasticized resin was unusually free from uncolloided particles.

In the above examples, water has been indicated as a suitable liquid in which to suspend the resins since it is a non-solvent for both the resin and the plasticizer. The use of water for this purpose is preferred for reasons of economy, but any liquid which is a non-solvent for both the resin and the plasticizer may be used to suspend the resin particles. The function of this non-solvent is purely that of a suspension medium and any swelling action it may possess for certain plastic materials is entirely incidental and in no manner contributes to the success of the invention.

Modifications of the invention as illustrated in the above examples will be readily apparent to those skilled in the art, and such modifications are included within the scope of the invention as defined in the appended claims.

We claim:

1. Process for making clear and homogeneous plastic compositions essentially free of uncolloided particles from polyvinyl partial acetal resins which comprises forming a clear solution of the resin in a water-miscible solvent; adding water slowly to this solution with agitation thereof, and precipitating the resin, the water being added at such a rate that the resin is precipitated in the form of finely-divided particles having an amorphous and porous structure capable of being penetrated by plasticizers to form compositions approaching colloidal solid solutions of the plasticizer in the resin without the use of special softening agents or methods; washing the particles with water to remove the solvent, and forming a highly fluid suspension consisting of said wet and porous resin particles, a water-insoluble plasticizer compatible with said resin, and at least about eight times as much water by weight as said resin and plasticizer; agitating said suspension and causing the plasticizer to penetrate the resin particles in the absence of any effective amount of solvent or softening agent other than said water-insoluble plasticizer, and without maintaining the resin in a softened condition by the application of heat; and thereafter removing the effluent water and recovering a clear and homogeneous plastic composition essentially free of uncolloided particles and capable of being sheeted into an interlayer for laminated glass.

2. Process for making clear and homogeneous plastic compositions essentially free of uncolloided particles from polyvinyl partial butyral resins which comprises forming a clear solution of the resin in methanol; adding water slowly to this solution with agitation thereof, and precipitating the resin, the water being added at such a rate that the resin is precipitated in the form of finely-divided particles having an amorphous and porous structure capable of being penetrated by plasticizers to form compositions approaching colloidal solid solutions of the plasticizer in the resin without the use of special softening agents or methods; washing the particles with water to remove the methanol, and forming a highly fluid suspension consisting of said wet and porous resin particles, a water-insoluble plasticizer compatible with said resin, and at least about eight times as much water by weight as said resin and plasticizer; agitating said suspension and causing the plasticizer to penetrate the resin particles in the absence of any effective amount of solvent or softening agent other than said water-insoluble plasticizer, and without maintaining the resin in a softened condition by the application of heat; and thereafter removing the effluent water and recovering a clear and homogeneous plastic composition essentially free of uncolloided particles and capable of being sheeted into an interlayer for laminated glass.

HENRY L. COX.
JACOB D. MATLACK.